US006923475B1

(12) United States Patent
Martin et al.

(10) Patent No.: US 6,923,475 B1
(45) Date of Patent: Aug. 2, 2005

(54) ATV TRAILER WITH FULLY-ROTATABLE SUSPENSION

(76) Inventors: Richard K. Martin, 305 N. Palermo Rd., Freedom, ME (US) 04941; Michael A. Raven, 35 Park Dr., Unity, ME (US) 04988; Gene A. Johnson, 424 Works Rd., Jackson, ME (US) 04921

(*) Notice: Subject to any disclaimer, the term of this patent is extended or adjusted under 35 U.S.C. 154(b) by 89 days.

(21) Appl. No.: 10/407,590

(22) Filed: Apr. 7, 2003

(51) Int. Cl.$^7$ .................. B62D 63/06; B62D 33/04
(52) U.S. Cl. .................. 280/789; 280/490.1; 296/182.1
(58) Field of Search .................. 280/789, 682, 280/124.11, 124.111, 490.1, 491.5, 839; 296/26.04, 32, 36, 182.1, 186.1, 185.1

(56) References Cited

U.S. PATENT DOCUMENTS

| | | | | |
|---|---|---|---|---|
| 425,578 | A | * | 4/1890 | Pearson ................... 62/239 |
| 730,352 | A | * | 6/1903 | Draper ................... 180/89.11 |
| 2,754,131 | A | * | 7/1956 | Tulin ................... 280/789 |
| 3,664,686 | A | * | 5/1972 | Anderson ................... 280/490.1 |
| 3,692,330 | A | * | 9/1972 | Kendall ................... 280/402 |
| 3,734,540 | A | * | 5/1973 | Thiermann ................... 280/482 |
| 3,772,997 | A | * | 11/1973 | Heap et al. ................... 105/406.1 |
| 3,797,850 | A | * | 3/1974 | Stout et al. ................... 280/789 |
| 3,891,231 | A | * | 6/1975 | Snoberger et al. ................... 280/789 |
| 4,103,926 | A | | 8/1978 | Johnston et al. |
| 4,264,082 | A | * | 4/1981 | Fouchey, Jr. ................... 280/5.26 |
| 4,331,346 | A | | 5/1982 | Walters |
| 4,790,548 | A | * | 12/1988 | Decelles et al. ................... 280/5.26 |
| 4,811,968 | A | * | 3/1989 | Bolden ................... 296/36 |
| 5,082,307 | A | | 1/1992 | Hollingworth, Jr. |
| 5,222,753 | A | | 6/1993 | Parish |
| 5,249,821 | A | * | 10/1993 | Ricketts et al. ................... 280/638 |
| 5,273,296 | A | * | 12/1993 | Lepek ................... 280/5.2 |
| 5,358,269 | A | * | 10/1994 | Jakeman et al. ................... 280/490.1 |
| 5,374,095 | A | * | 12/1994 | Ramseth ................... 296/32 |
| 5,468,008 | A | * | 11/1995 | Hecht ................... 280/789 |
| 5,509,709 | A | * | 4/1996 | Carroll ................... 296/36 |
| 5,513,868 | A | * | 5/1996 | Barr ................... 280/789 |
| D376,564 | S | | 12/1996 | Mishoe |
| 5,782,490 | A | * | 7/1998 | Kendall et al. ................... 280/789 |
| 5,823,559 | A | | 10/1998 | Priesgen et al. |
| 5,992,121 | A | * | 11/1999 | Lindsay ................... 280/789 |
| 6,099,013 | A | * | 8/2000 | Stoss ................... 280/407 |
| 6,286,854 | B1 | | 9/2001 | Cross |
| 6,290,023 | B1 | * | 9/2001 | Martin ................... 280/789 |
| 6,378,904 | B1 | | 4/2002 | Niehoff |
| 6,557,882 | B2 | * | 5/2003 | Harrington ................... 280/415.1 |
| 6,742,787 | B1 | * | 6/2004 | Wheeler ................... 280/5.26 |

* cited by examiner

*Primary Examiner*—Paul N. Dickson
*Assistant Examiner*—Joselynn Y. Sliteris
(74) *Attorney, Agent, or Firm*—John D. Gugliotta; P. Jeff Martin

(57) ABSTRACT

An ATV trailer with fully-rotatable suspension is provided. The ATV trailer is formed of frame members fabricated of square, metal tubing and welded together to form a framework of rails. A downwardly sloping tongue terminates into a ball hitch coupler being mountable to a hitch of a standard ATV. An I-suspension wheel assembly is provided which includes a wheel assembly bracket with a stub axle being adapted to mountably support an I-beam suspension apparatus. The I-beam suspension apparatus includes an I-member being fully rotatable 360° about the stub axle. Spindles are mounted to the I-member for mountably supporting standard ATV wheels. A metal box-like enclosure of walls forming a water-storage tank is mounted atop the frame members.

14 Claims, 8 Drawing Sheets

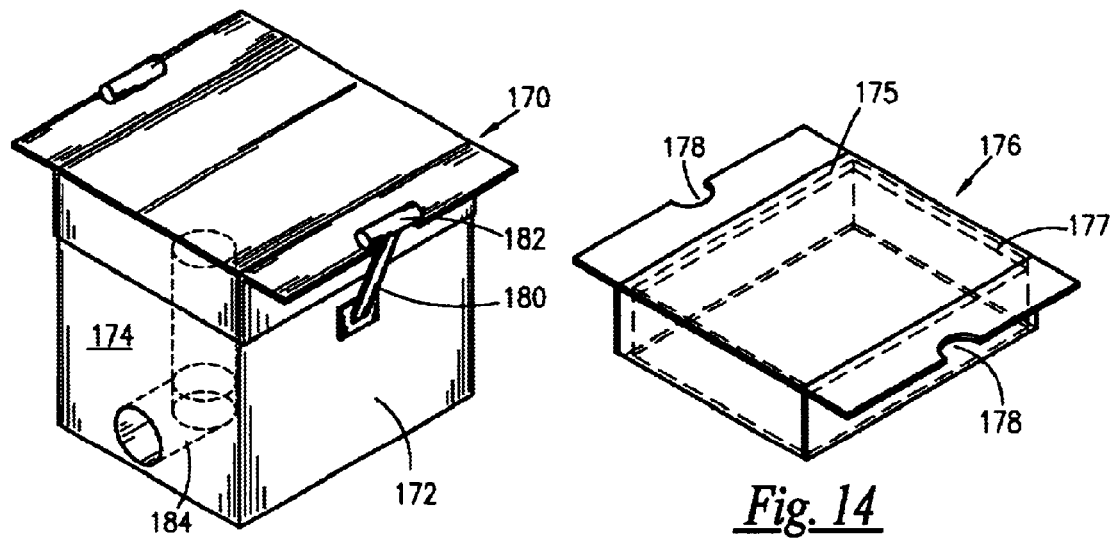
Fig. 13
Fig. 14
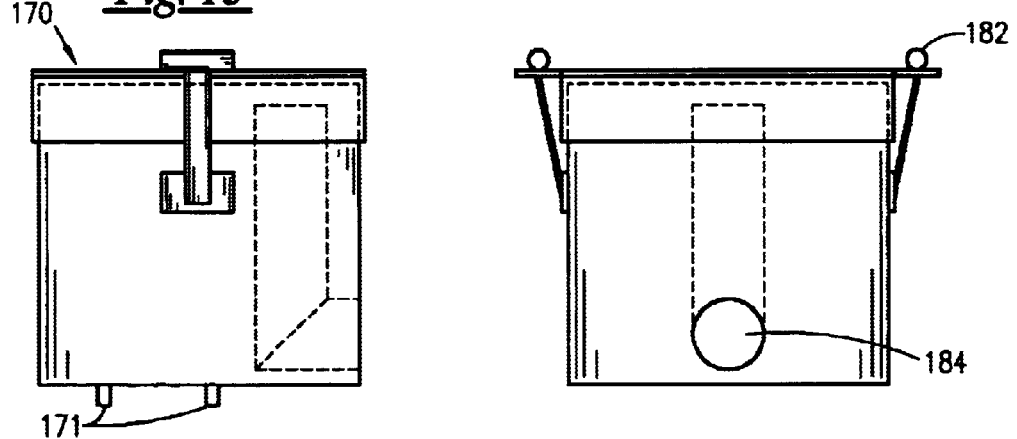
Fig. 15
Fig. 16
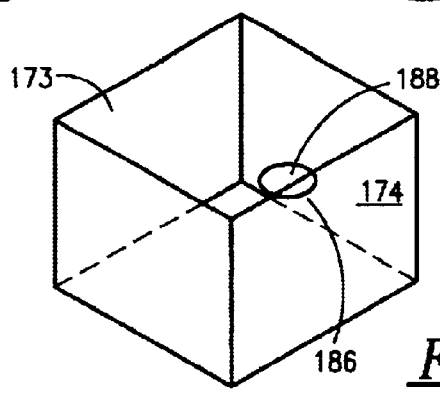
Fig. 17

ATV TRAILER WITH FULLY-ROTATABLE SUSPENSION

RELATED APPLICATIONS

The present invention was first described in Disclosure Document Registration 516,201 filed on Jul. 31, 2002 under 35 U.S.C. §122, 37 C.F.R. §1.14, and MPEP §1706. There are no previously filed, nor currently any co-pending applications, anywhere in the world.

BACKGROUND OF THE INVENTION

1. Field of the Invention

The present invention relates generally to all-terrain vehicle (ATV) trailers and, more particularly, to an ATV trailer with fully-rotatable suspension.

2. Description of the Related Art

Today, all-terrain vehicles (ATV) are used extensively by outdoor sportsmen such as hunters, and others including farmers, ranchers, and firefighters to maneuver and travel through heavily encumbered wilderness areas, i.e., areas inundated with rocks and boulders, tree stumps, marshy areas, and heavily forested areas. In the past, conventional ATV trailers have been pulled behind standard ATV's for the purpose of hauling various equipment, such as hunting gear or firefighting equipment, but have been unsuccessful at doing such through rough terrain. Thus, an ATV trailer capable of operating through heavily encumbered wilderness is desirable.

Accordingly, a need has arisen for a means by which an ATV trailer can easily maneuver over substantial obstacles encountered in the wilderness in a perfunctory manner. The development of the ATV trailer with fully-rotatable suspension fulfills this need.

A search of the prior art did not disclose any patents that read directly on the claims of the instant invention; however, the following references were considered related:

| U.S. Pat. No. | Inventor | Issue Date |
|---|---|---|
| 6,378,904 | Niehoff | Apr. 30, 2002 |
| D376,564 | Mishoe | Dec. 17, 1996 |
| 4,331,346 | Walters | May 25, 1982 |
| 4,103,926 | Johnston et al. | Aug. 1, 1978 |
| 5,222,753 | Parish | Jun. 29, 1993 |
| 5,082,307 | Hollingworth, Jr. | Jan. 21, 1992 |
| 5,823,559 | Priesgen et al. | Oct. 20, 1998 |
| 6,286,854 | Cross | Sep. 11, 2001 |

SUMMARY OF THE INVENTION

Therefore, it is an object of the present invention to provide an ATV trailer capable of easily maneuvering over substantial obstacles encountered in the wilderness in a perfunctory manner.

It is another object of the present invention to provide an ATV trailer formed of a network of metal frame members.

It is another object of the present invention to provide a network of metal frame members constructed from metal material being aluminum and/or mild steel.

It is another object of the present invention to provide an ATV trailer with a downwardly sloping tongue which terminates into a ball hitch coupler being mountable to a hitch of a standard ATV.

It is another object of the present invention to provide an ATV trailer having an I-suspension wheel assembly which includes an I-member being fully rotatable 360° about a stub axle which has a four-bolt central hub mounted thereto.

It is another object of the present invention to provide aluminum sidewalls forming an enclosure above the side rails.

It is another object of the present invention to provide cargo bed rails vertically mounted to the cargo bed.

It is another object of the present invention to provide a water-storage tank with removable tank fill cover.

It is another object of the present invention to provide a bumper which functions to provide protection for a water pump device.

It is another object of the present invention to provide a tool box mounted to an underside of both side rails, behind the tongue.

It is another object of the present invention to provide a cargo platform for supporting the water pump device.

Briefly described according to one embodiment of the present invention, an ATV trailer with fully-rotatable suspension is provided. The ATV trailer is formed of frame members fabricated of square, metal tubing and welded together to form a front rail, side rails, and a rear rail. The ATV trailer includes a downwardly sloping tongue which terminates into a ball hitch coupler being mountable to a hitch of a standard ATV.

The ATV trailer defines an I-suspension wheel assembly which includes a wheel assembly bracket with stub axle being adapted to mountably support an I-beam suspension apparatus. The I-beam suspension apparatus includes an I-member being fully rotatable 360° about stub axle which has a four-bolt central hub mounted thereto.

Mounted atop frame members via bolts are a pair of elongated sidewalls joined by a forward sidewall and a rearward gate. A cargo bed is provided to serve as a load-bearing platform for various equipment. Cargo bed rails are vertically mounted to the cargo bed in a manner so as to define a perimeter of the cargo bed. A water-fill tower with removable tank fill cover is located atop the cargo bed near a rear portion thereof.

A bumper, which projects horizontally from the rear rail, functions to provide protection for a water pump device which is mounted atop a water pump support platform. A tool box is mounted to an underside of both side rails, behind the tongue.

The use of the present invention allows for an ATV trailer to easily maneuver over substantial obstacles encountered in the wilderness in a perfunctory manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 13 is a perspective view of the water-storage tank according to the preferred embodiment of the present invention;

FIG. 14 is a perspective view of the removable tank fill cover;

FIG. 15 is a side elevational view of the water-storage tank according to the preferred embodiment of the present invention;

FIG. 16 is a front end view thereof; and

FIG. 17 is a perspective view of the tank sump of the present invention, according to the preferred embodiment.

DESCRIPTION OF THE PREFERRED EMBODIMENT

1. Detailed Description of the Figures

Figure 1:
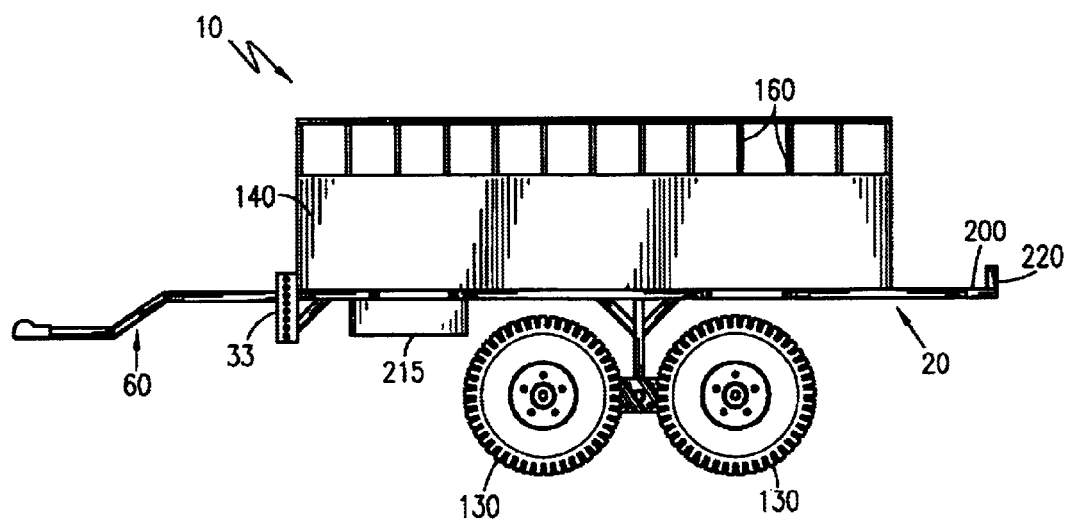
FIG. 1 is a perspective view of an ATV trailer with fully-rotatable suspension, according to the preferred embodiment of the present invention.

Referring now to FIGS. 1–4, an ATV trailer with fully-rotatable suspension 10 is shown, according to the present invention, comprised of a main frame assembly 20 defining frame members 22 fabricated of square, metal tubing and welded together to form a front rail 24, opposing side rails 26, 27, and a rear rail 29. To add strength to front corners 26a, 27a, hypotenuse support members 30, 32 are welded horizontally between side rails 26, 27 and front rail 24. It is envisioned that the main frame assembly 20 is constructed of aluminum or mild tubular steel.

Figure 2:
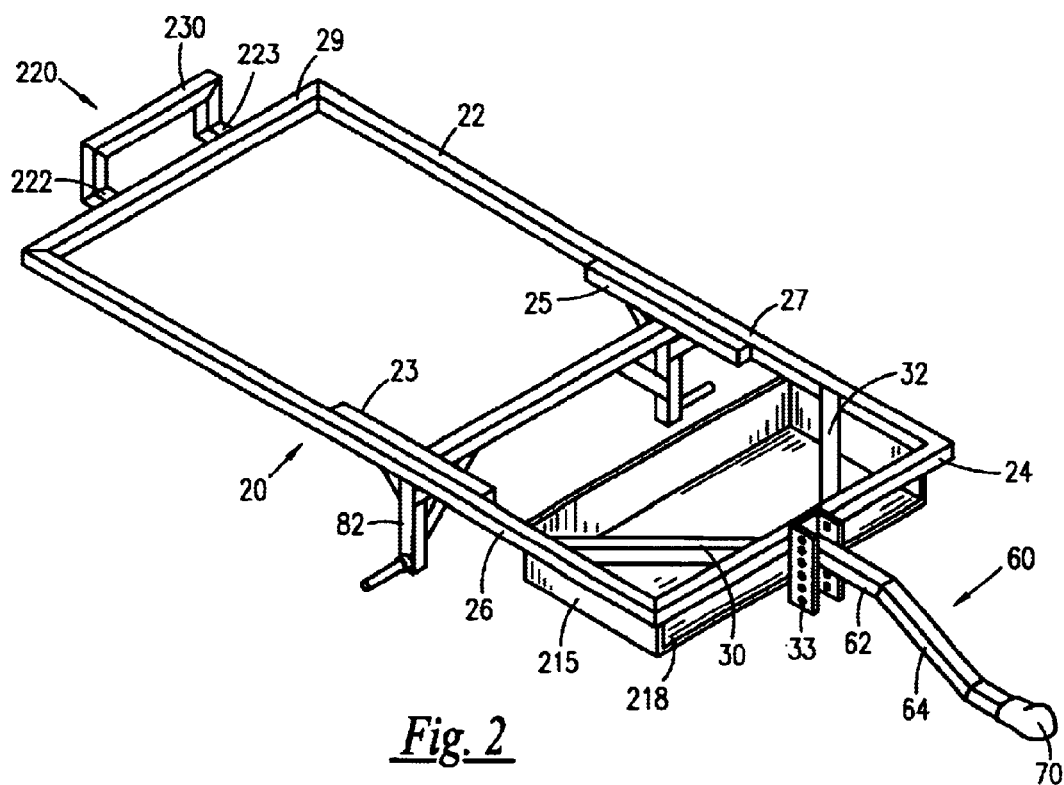
FIG. 2 is a perspective view of the frame members of the present invention, according to the preferred embodiment of the present invention.
Figure 3:
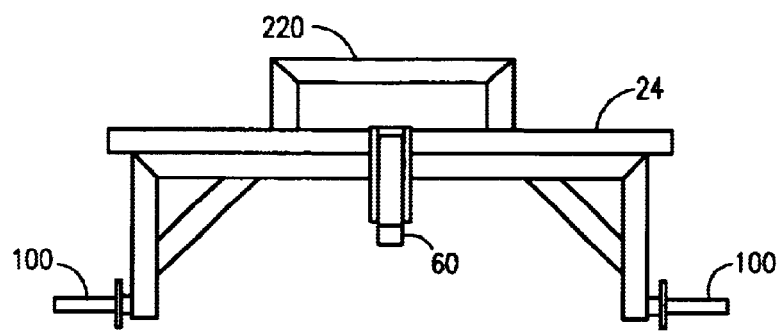
FIG. 3 is a front end view thereof.
Figure 4:
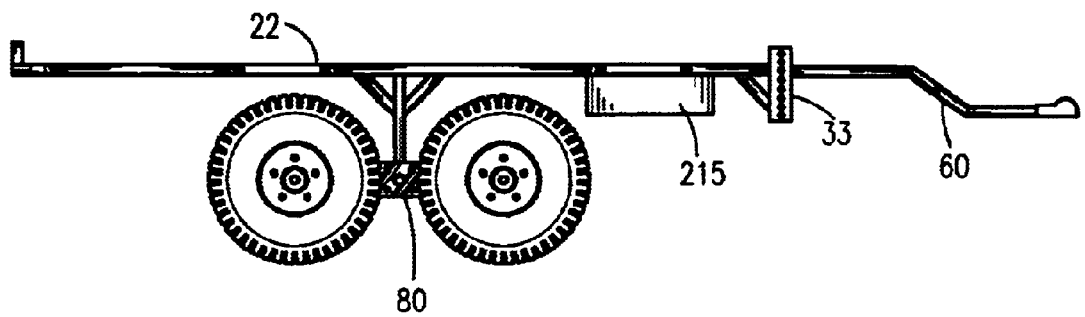
FIG. 4 is a side elevational view of the frame members shown as including an I-suspension wheel assembly, according to the preferred embodiment of the present invention.
Figure 5:
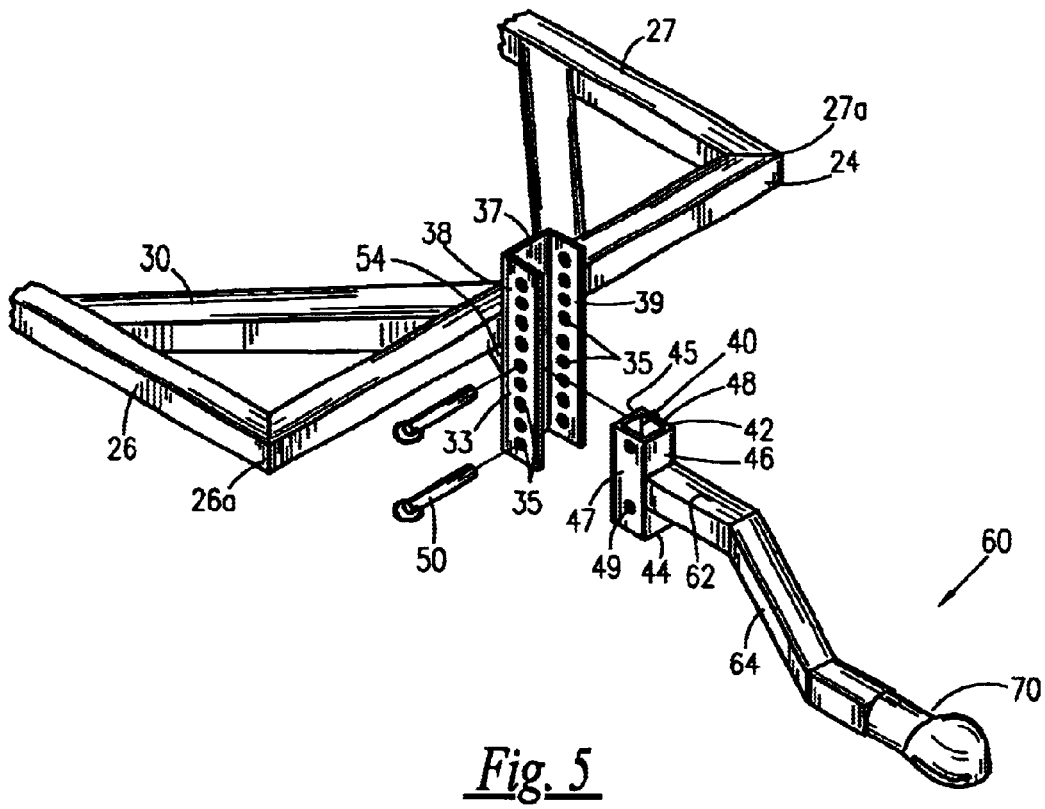
FIG. 5 is a partial perspective view of frame members shown with bracket and tongue according to the preferred embodiment of the present invention.
Figure 6:
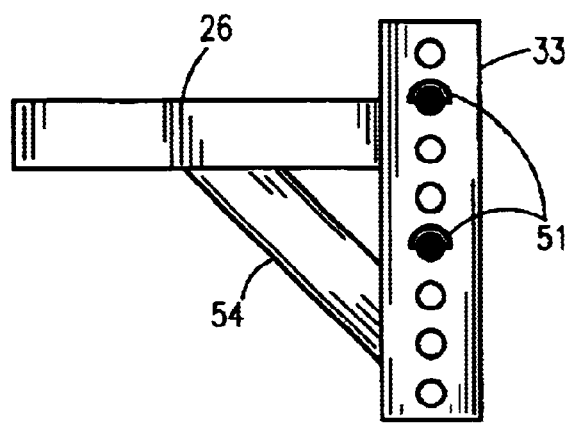
FIG. 6 is a side elevational view of bracket.
Figure 7:
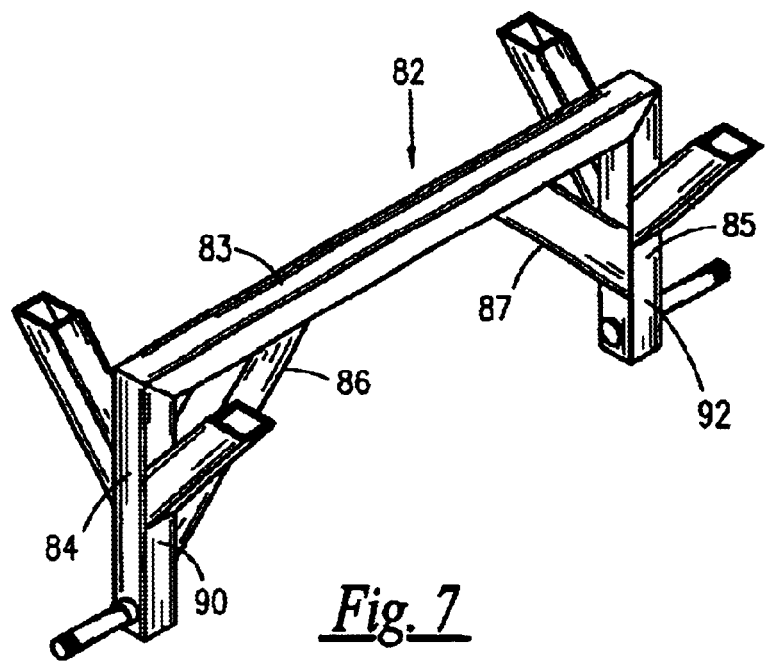
FIG. 7 is a perspective view of the wheel assembly bracket according to the preferred embodiment of the present invention.
Figure 8:
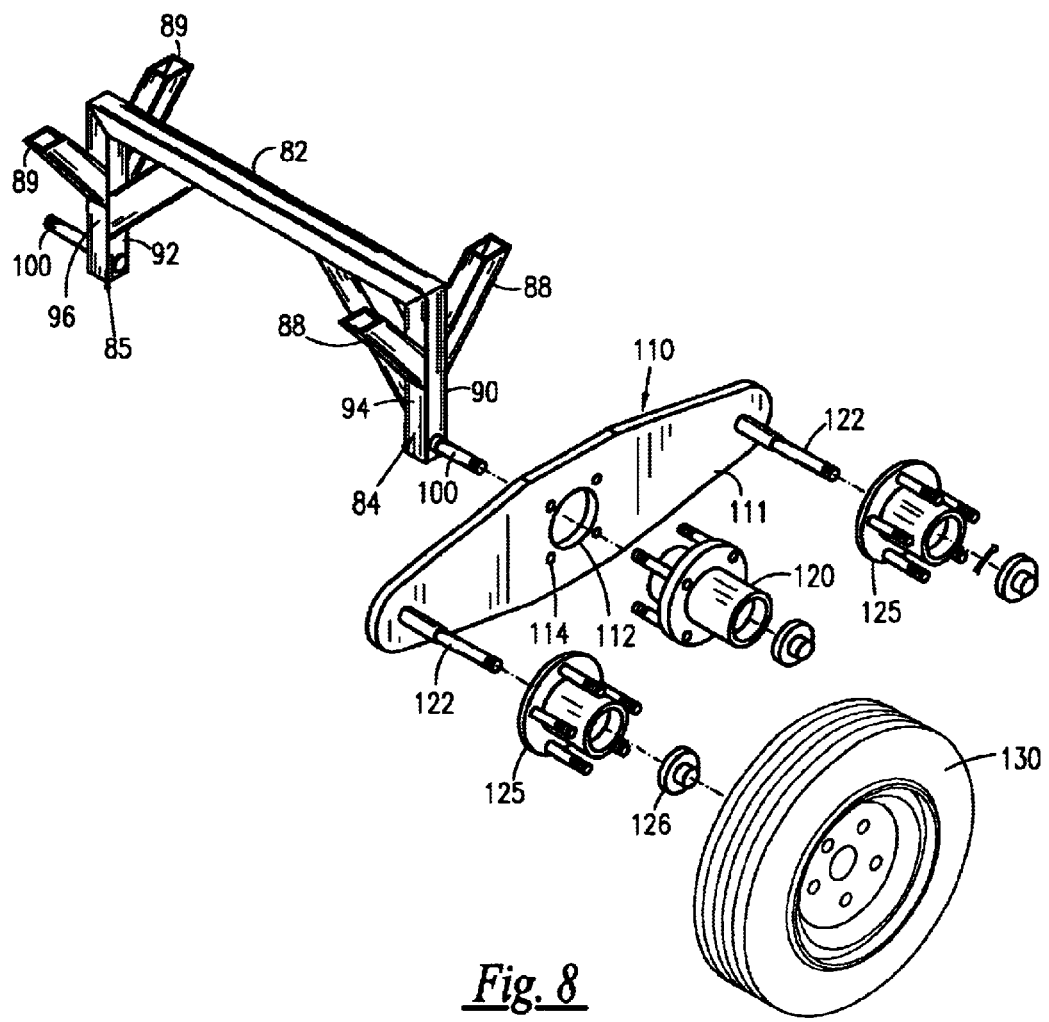
FIG. 8 is an exploded perspective view of the I-suspension wheel assembly according to the preferred embodiment of the present invention.

Referring now more specifically to FIGS. 2, 5, and 6, a bracket 33, welded vertically to an external, frontal surface of front rail 24, telescopically accommodates a rectangular, hollow sleeve 40. The bracket 33 is of a generally C-shaped configuration, having a planar rear wall 37 and two sidewalls 38, 39 extending perpendicularly therefrom. Each sidewall 38, 39 includes a plurality of holes 35 aligned in linear series and being spaced apart approximately one inch.

The sleeve 40 defines a top 42 and bottom 44, a rear sidewall 45, a front sidewall 46, and a pair of lateral sidewalls 47, 48. Each lateral sidewall 47, 48 defines a pair of apertures 49 spaced apart approximately three inches, being configured to fixedly mount sleeve 40 within a desired vertical position within bracket 33 via a mounting element 50, such as a spring safety locking pin 51. The spring safety locking pin 51 is journaled through a desired hole 35 of sidewall 38 of bracket 33, through selected apertures 49 of lateral sidewalls 47, 48, and finally through a corresponding hole 35 in sidewall 39 of bracket 33. In order to add structural rigidity to the bracket 33, a brace member 54 is welded between a lower external surface of front rail 24 and a lower end of rear wall 37 of bracket 33.

Projecting from sleeve 40 along a linearly elongated centerline of the front sidewall 46 thereof is a tongue 60. The tongue 60 is comprised of an elongated, horizontally oriented forward end 62 which extends a length of approximately nine inches, then slopes downwardly at an angle of approximately 42° so as to form sloped member 64. The sloped member 64 extends a length of approximately nine inches and terminates into a ball hitch coupler 70 which is mounted to a hitch of a standard all-terrain vehicle (ATV) 250, and wherein ball hitch coupler 70 lies in a parallel plane with respect to forward end 62 of tongue 60.

Referring now to FIGS. 2, 4, 7, and 8, in order to facilitate added structural strength and mountable support for an I-suspension wheel assembly 80, a pair of horizontal frame members 23, 25 are provided, wherein horizontal frame members 23, 25 are each welded to a respective inner sidewall of side rails 26, 27, respectively.

The I-suspension wheel assembly 80 defines a wheel assembly bracket 82, of a generally C-shaped configuration, having an upper member 83 welded perpendicularly to each lower surface of horizontal frame member 23 and side rail 26, and horizontal frame member 25 and side rail 27. The upper member 83 includes a downwardly depending axle support arm 84, 85 at opposed ends thereof.

To enhance lateral structural rigidity of the wheel assembly bracket 82, cross members 86, 87 are welded between each axle support arm 84, 85 and upper member 83, respectively.

To enhance longitudinal structural rigidity of the wheel assembly bracket 82, each axle support arm 84, 85 has a pair of appendage buttresses 88, 89 respectively, projecting upwardly in an inclined manner, from frontal sidewalls 90, 92 and rearward sidewalls 94, 96 thereof, respectively.

A stub axle 100 is suitably mounted within and extends through a lower, outer sidewall of each axle support arm 84, 85. Each stub axle 100 is adapted to mountably support an I-beam suspension apparatus 110. The I-beam suspension apparatus 116 defines an elongated, oblong, planar I-member 111 having a hub receiving orifice 112 located centrally therein, and a plurality of threaded hub-bolt receiving apertures 114. The hub receiving orifice 112 is slidably received by the stub axle 100, and a four-bolt central hub 120 with bearings is mounted to the I-member 111.

Spindles 122 are mounted perpendicularly along opposed ends of the I-member 111, wherein each end is adapted to mountably support a five-bolt hub 125 with bearings. Each five-bolt hub 125 and four-bolt central hub 120 is complete with a dust cap 126 coupled thereto. Standard ATV wheels 130 are mounted to each five-bolt hub 125.

The I-beam suspension apparatus 110 imparts important functional utility to the present invention as will be described hereinbelow. The I-member 111 functions as a lever fully rotatable 360° about a fulcrum, wherein fulcrum being stub axle 100 with four-bolt central hub 120 mounted thereto.

Figure 9:
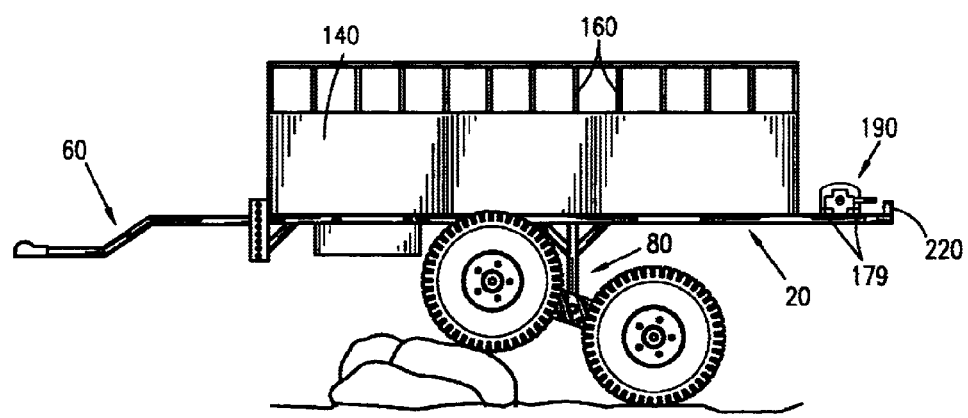
FIG. 9 is perspective view of the present invention shown engaged against an encumbrance according to the preferred embodiment of the present invention.
Figure 10:
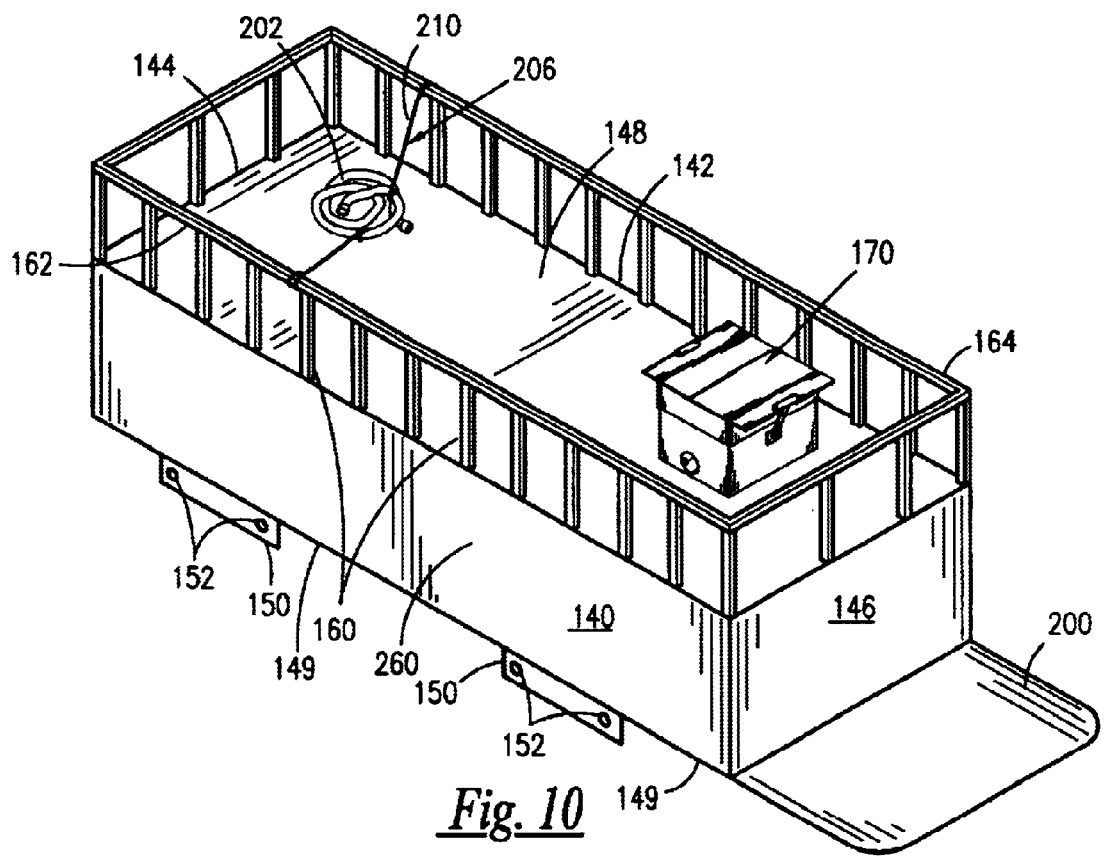
FIG. 10 is a perspective view of the water storage tank located atop the cargo bed according to the preferred embodiment of the present invention.
Figure 11:
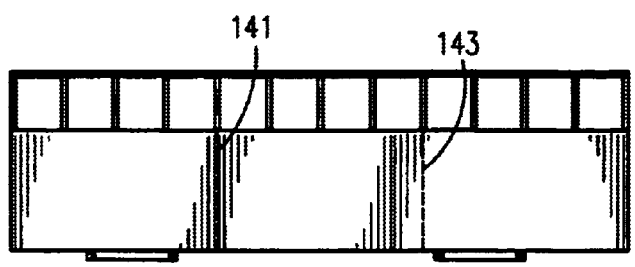
FIG. 11 is side elevational view thereof.
Figure 12:
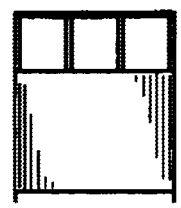
FIG. 12 is a rear end view thereof.

As shown in FIG. 9, during operation, upon standard ATV wheels' 130 engagement against boulders, tree stumps, deep holes and the like while traversing rough terrain, I-member 111 rotates in a clockwise direction (when viewing present invention from the left side view), then rotate counter-clockwise as ATV wheels 130 progress downwardly over encumbrance, thereby easily maneuvering over substantial obstacles encountered in the wilderness in a perfunctory manner, which additionally prevents inadvertent tipping and overturning of the ATV trailer with fully-rotatable suspension 10.

Referring now more specifically to FIGS. 1, and 10–12, mounted atop frame members 22 via bolts 136 are a pair of elongated sidewalls 140, 142 joined by a forward endwall 144, a rearward endwall 146, and a top wall 148 opposed by a bottom wall 149 which collectively form an enclosed structure having a generally rectangular configuration which serves as a water-storage tank 260. Two baffles 141, 143 are welded within water-storage tank 260. Sidewalls 140, 142 and end walls 144, 146 have a height measuring approximately 12 inches. The top wall 148 additionally serves as a load-bearing platform for various equipment. Sidewalls 140, 142, end walls 144, 146, top wall 148, and bottom wall 149 are fabricated of polished, diamond-plated aluminum.

In order to facilitate mounting of sidewalls 140, 142, 144, and 146 to the frame members 22, each elongated sidewall 140, 142 includes a pair of mounting plates 150 which extends downwardly therefrom and are spaced laterally there along. Bolts 136 are then inserted through apertures 152 formed within mounting plates 150 and through side rails 26, 27. Extending perpendicularly from a bottom of rearward endwall 146, and positioned in a horizontal plane, lies a water pump support platform 200. The platform 200 is of a generally rectangular configuration having convex-shaped forward corners, and is fabricated of polished, diamond-plated aluminum.

Cargo bed rails 160 are vertically mounted to the top wall 148, wherein cargo bed rails 160 define a perimeter thereof. Two elongated, parallel rail members 162 and two perpendicularly-oriented parallel rail members 164 are mounted atop cargo bed rails 160. It is envisioned that the cargo bed rails 160 are adapted for carrying camping equipment including a canoe.

Referring now to FIGS. 10, and 13–17, the water-storage tank 260 includes a fill tower 170 fabricated of polished, diamond-plated aluminum, and is mounted via bolts 171 atop the top wall 148, and is located near a rear portion thereof. The fill tower 170 defines a bottom 172 and four sides 174 which form a square configuration having an open top 173. A removable tank fill cover 176 is of a square configuration having a length measuring slightly greater than a length of bottom 172 of fill tower 170. Concave recesses 178 are formed along opposed sides thereof, and wherein each recess 178 is designed to lockably receive a rubber head portion 182 of a hand latch 180 being vertically mounted to opposed sides 174 of fill tower 170. The tank fill cover 176 is further defined as being hollow forming an internal cavity 175 filled with foam rubber material 177.

An L-shaped, aluminum siphon pipe 184 is suitably mounted to the bottom 172 of fill tower 170 to facilitate water drainage therefrom. A tank sump 186 is provided along a lower portion of side 174, positioned behind L-shaped aluminum siphon pipe 184. The tank sump 186 includes a manual foot valve 188 for facilitating drainage of water therethrough. A water pump device 190 is removably coupled via rubber tie downs 179 to the water pump support platform 200. The water pump device 190 not only facilitates delivery of water, but being easily removable, the water pump device 190 is ideal for use in a brook or pond should the necessity arise. It is envisioned that the water pump device 190 would include two-stroke or four-stroke motors.

An elongated utility hose 202 is provided and is suitably anchored to the cargo bed rails 160 so as to reside atop the top wall 148 via an attachment assembly 206. Attachment assembly 206 is envisioned as including a binding cord with attachment clip 210.

Referring now to FIGS. 1–4, and 9, a bumper 220 is disclosed which functions to provide protection for the water pump device 190. The bumper 220 is defined of a pair of linear members 222, 223 which projects horizontally from rear rail 29, spaced laterally apart, and wherein linear members 222, 223 are connected perpendicularly by a C-shaped guard member 230 at ends of linear members 222, 223 such that C-shaped guard member 230 projects vertically from the ends of linear members 222, 223. Bumper 220 is fabricated of square, aluminum tubing or mild steel tubing.

Finally, referring to FIGS. 1–4 and 9, a tool box 215 with pull-out drawer 218 is mounted to an underside of both side rail 26 and side rail 27, behind tongue 60. The tool box 215 is fabricated of aluminum plate and has a polished aluminum diamond plated front cover 216.

2. Operation of the Preferred Embodiment

To use the present invention, the ball hitch coupler 70 of the tongue 60 is mounted to the hitch of a standard ATV 250, and user pulls the ATV trailer 10 via the standard ATV 250 through heavily encumbered wilderness areas.

The use of the present invention allows for an ATV trailer to easily maneuver over substantial obstacles encountered in the wilderness in a perfunctory manner.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be broadly limited only by the following claims.

What is claimed is:

1. An all-terrain vehicle trailer comprising:

a main frame assembly;

frame members, said frame members forming said main frame assembly, wherein said frame members are welded together to form a front rail, opposing side rails, and a rear rail;

hypotenuse support members, said hypotenuse support members are welded horizontally between said opposing side rails and said front rail to add strength to front corners;

a bracket, said bracket is welded vertically to an external, frontal surface of said front rail, said bracket telescopically accommodates a rectangular, hollow sleeve, wherein said bracket is of a generally C-shaped configuration having a planar rear wall and two sidewalls extending perpendicularly therefrom, and wherein each of said sidewalls includes a plurality of holes aligned in linear series;

a brace member, said brace member is welded between a lower external surface of said front rail and a lower end of said planar rear wall of said bracket in order to add structural rigidity to said bracket;

a tongue, said tongue projects from said sleeve along a linearly elongated centerline of said front rail;

a pair of horizontal frame members, wherein each of said pair of horizontal frame members is welded to a respective inner sidewall of said opposing side rails;

an I-suspension wheel assembly; said I-suspension wheel assembly comprises a wheel assembly bracket of a generally C-shaped configuration having an upper member welded perpendicularly to each lower surface of said pair of horizontal frame members and said opposing side rails, said upper member includes a downwardly depending axle support arm at opposed ends of said upper member;

a stub axle, said stub axle is suitably mounted within and extends through a lower, outer sidewall of each said axle support arm;

an I-beam suspension apparatus, said I-beam suspension apparatus is mountably supported by said stub axle;

a pair of elongated sidewalls, said pair of elongated sidewalls are mounted atop said frame members via bolts, said pair of elongated sidewalls are joined by a forward endwall, a rearward endwall, and a top wall being opposed by a bottom wall wherein said pair of elongated sidewalls, said forward endwall, said rearward endwall, said top wall, and said bottom wall collectively form an enclosed structure having a generally rectangular configuration and which serves as a water-storage tank; and a water pump support platform, said water pump support platform extends perpendicularly from a bottom of said rearward endwall.

2. The all-terrain vehicle trailer of claim 1, wherein said rectangular, hollow sleeve defines a top, a bottom, a rear sidewall, a front sidewall, and a pair of lateral sidewalls, wherein each of said pair of lateral sidewalls defines a pair of apertures spaced apart approximately three inches, being configured to fixedly mount said rectangular, hollow sleeve within a desired vertical position within said bracket via a mounting element.

3. The all-terrain vehicle trailer of claim 1, wherein said tongue is comprised of an elongated, horizontally oriented forward end which extends a length of approximately nine inches, then slopes downwardly at an angle of approximately 42° so as to form a sloped member, said sloped member extends a length of approximately nine inches and terminates into a ball hitch coupler which is mounted to a hitch of a standard all-terrain vehicle, and wherein said ball hitch coupler lies in a parallel plane with respect to said forward end of said tongue.

4. The all-terrain vehicle trailer of claim 1, wherein said wheel assembly bracket includes a cross member welded between each said axle support arm, and said upper member so as to enhance lateral structural rigidity of said wheel assembly bracket, and wherein each said axle support arm has a pair of appendage buttresses projecting upwardly in an inclined manner from frontal sidewalls and rearward sidewalls of each said axle support arm, so as to enhance longitudinal structural rigidity of said wheel assembly bracket.

5. The all-terrain vehicle trailer of claim 1, wherein said I-beam suspension apparatus defines an I-member having a hub receiving orifice located centrally therein, and a plurality of threaded hub-bolt receiving apertures, said hub receiving orifice is slidably received by said stub axle, and a four-bolt central hub with bearings is mounted to said I-member, said I-member includes spindles mounted perpendicularly along opposed ends of said I-member, wherein each of said opposed ends is adapted to mountably support a five-bolt hub with bearings, wherein each said five-bolt hub is adapted for mounting of standard ATV wheels thereto.

6. The all-terrain vehicle trailer of claim 1, wherein said pair of elongated sidewalls each includes a pair of mounting plates which extends downwardly and are spaced laterally, said pair of mounting plates having apertures formed therein through which bolts are inserted and finally inserted through said side rails.

7. The all-terrain vehicle trailer of claim 1, wherein said water-storage tank has a ninety-gallon water capacity and has two baffles welded therein.

8. The all-terrain vehicle trailer of claim 1, wherein said top wall is planar and functions additionally as a load-bearing platform for various equipment.

9. The all-terrain vehicle trailer of claim 1, wherein said water pump support platform is fabricated of polished, diamond-plated aluminum.

10. The all-terrain vehicle trailer of claim 1, wherein said pair of elongated sidewalls, said forward endwall, said rearward endwall, said top wall, and said bottom wall are fabricated of polished, diamond-plated aluminum.

11. The all-terrain vehicle trailer of claim 2, wherein said mounting element is a spring safety locking pin.

12. The all-terrain vehicle trailer of claim 1, further comprising:

cargo bed rails, said cargo bed rails are vertically mounted to said top wall, wherein said cargo bed rails define a perimeter thereof, said cargo bed rails having two elongated, parallel rail members and two perpendicularly-oriented parallel rail members mounted atop said cargo bed rails, wherein said cargo bed rails are adapted for carrying camping equipment;

a fill tower, said fill tower is fabricated of polished, diamond-plated aluminum, and is mounted via bolts atop said top wall, and is located near a rear portion of said top wall, said fill tower defines a bottom and four sides which form a square configuration having an open top;

a removable tank fill cover, said removable tank fill cover is configured to cover said open top of said fill tower, said removable tank fill cover is of a square configuration having a length measuring slightly greater than a length of bottom of said fill tower, said removable tank fill cover having concave recesses formed along opposed sides thereof, and wherein each of said concave recesses lockably receives a rubber head portion of a hand latch being vertically mounted to opposed sides of said four sides of said fill tower, and wherein said removable tank fill cover is further defined as being hollow, forming an internal cavity filled with foam rubber material;

an L-shaped, aluminum siphon pipe, said L-shaped, aluminum siphon pipe is suitably mounted to said bottom of said fill tower to facilitate water drainage therefrom;

a tank sump, said tank sump is provided along a lower portion of a side of said four sides of said fill tower, positioned behind said L-shaped aluminum siphon pipe, said tank sump includes a manual foot valve for facilitating drainage of water through said manual foot valve;

a bumper, said bumper is defined of a pair of linear members which projects horizontally from said rear rail, spaced laterally apart, wherein said linear members are connected perpendicularly by a C-shaped guard member at ends of said linear members such that C-shaped guard member projects vertically from said ends of said linear members, said bumper is fabricated of square, aluminum tubing or mild steel tubing;

a tool box, said tool box is mounted to an underside of both said side rails, behind said tongue, said tool box is fabricated of aluminum plate and has a polished aluminum diamond plated front cover and a pull-out drawer;

a water pump device, said water pump device includes two-stroke or four-stroke motors; and an elongated utility hose, said elongated utility hose is suitably anchored to said cargo bed rails so as to reside atop said top wall via an attachment assembly.

13. The all-terrain vehicle trailer of claim 5, wherein said I-member is of an elongated, oblong, planar configuration and functions as a lever fully rotatable 360° about said stub axle, wherein said stub axle with said four-bolt central hub mounted thereto serves as a fulcrum, whereby during engagement of said standard ATV wheels against encumbrances while traversing rough terrain, said I-member rotates, then counter-rotates as said standard ATV wheels progress downwardly over the encumbrance, thereby easily maneuvering over substantial obstacles encountered in the wilderness in a perfunctory manner, which additionally prevents inadvertent tipping and overturning of said ATV trailer.

14. The all-terrain vehicle trailer of claim 12, wherein said attachment assembly includes a binding cord with attachment clip.

* * * * *